United States Patent
Walberg

(10) Patent No.: US 10,288,219 B1
(45) Date of Patent: May 14, 2019

(54) REVERSIBLE PINATA MOUNT ASSEMBLY

(71) Applicant: Diana Walberg, Mesa, AZ (US)

(72) Inventor: Diana Walberg, Mesa, AZ (US)

( * ) Notice: Subject to any disclaimer, the term of this patent is extended or adjusted under 35 U.S.C. 154(b) by 6 days.

(21) Appl. No.: 15/904,389

(22) Filed: Feb. 25, 2018

(51) Int. Cl.
  *A63B 67/10* (2006.01)
  *F16M 13/02* (2006.01)
  *A63H 33/00* (2006.01)
  *A63H 37/00* (2006.01)

(52) U.S. Cl.
  CPC .............. *F16M 13/02* (2013.01); *A63B 67/10* (2013.01); *A63H 33/00* (2013.01); *A63H 37/00* (2013.01)

(58) Field of Classification Search
  CPC ........ F16M 13/02; A63B 67/10; A63H 33/00; A63H 37/00
  USPC .......... 248/207, 558, 911, 912, 227.1, 227.2, 248/227.3, 231.31, 231.85, 218.4, 219.1, 248/219.4
  See application file for complete search history.

(56) References Cited

U.S. PATENT DOCUMENTS

| | | | | |
|---|---|---|---|---|
| 5,263,675 A | * | 11/1993 | Roberts | A01M 31/00 182/142 |
| 5,310,151 A | * | 5/1994 | Engel | F21V 21/08 248/219.4 |
| 5,588,907 A | | 12/1996 | DePietro et al. | |
| 5,622,342 A | * | 4/1997 | Mills | F16M 11/42 248/126 |
| 5,694,733 A | * | 12/1997 | Gallemore, II | G09F 17/00 116/173 |
| 5,702,081 A | * | 12/1997 | Gallemore, II | A47B 96/061 248/218.4 |
| 5,769,372 A | * | 6/1998 | Klosterman | F41B 5/1446 248/217.3 |
| 5,857,651 A | * | 1/1999 | Kunevicius | F41B 5/14 248/218.4 |
| 6,059,240 A | * | 5/2000 | Gorsuch | F41B 5/14 124/86 |
| 6,202,868 B1 | | 3/2001 | Murray | |
| 6,202,964 B1 | * | 3/2001 | Thornhill | A01M 31/02 248/219.4 |
| 6,412,736 B1 | | 7/2002 | Zaragoza | |
| 6,685,146 B1 | | 2/2004 | Sanchez, Jr. | |
| 6,739,964 B2 | | 5/2004 | Gearhart | |
| 6,978,974 B1 | | 12/2005 | Marasco | |
| 7,086,820 B1 | | 8/2006 | Blake | |

(Continued)

*Primary Examiner* — Kimberly T Wood
(74) *Attorney, Agent, or Firm* — Invention To Patent Services; Alex Hobson

(57) ABSTRACT

A piñata mount assembly has a plurality of versatile attachment orientations for attachment to either a discrete vertical member, such as a tree trunk, pole or post, or over the top of a wall. The piñata mount assembly has a reversible wall support that can be coupled to the main bracket in opposing orientations. The reversible wall support has different mount surfaces for mounting to different types surfaces. The piñata mount assembly has a vertical portion coupled with the reversible wall support. The vertical portion is coupled with a horizontal portion that has threads for engagement with threads of a knob for moving the horizontal portion. A claw on the horizontal portion may be used to mount the piñata mount assembly over the top of a wall. The reversible wall support may be flipped around for mounting to a discrete vertical member, such as a tree trunk.

16 Claims, 8 Drawing Sheets

(56) References Cited

U.S. PATENT DOCUMENTS

| | | |
|---|---|---|
| 7,246,463 B1 | 7/2007 | Arnot |
| 7,476,149 B2 | 1/2009 | Burrows |
| 7,544,120 B1 | 6/2009 | Tardiff et al. |
| 7,748,195 B2 | 7/2010 | Keith |
| 7,810,265 B2 * | 10/2010 | Beatty .................... G09F 17/00 |
| | | 116/173 |
| 9,156,664 B1 | 10/2015 | Lopez |
| 9,161,526 B2 | 10/2015 | Nipper |
| 9,192,156 B2 | 11/2015 | McHugh |
| 9,345,941 B1 | 5/2016 | Celedon et al. |
| 2008/0073468 A1 | 3/2008 | Arroyo |
| 2012/0312937 A1 | 12/2012 | Weber |
| 2013/0302131 A1 | 11/2013 | Nessner et al. |
| 2014/0051319 A1 | 2/2014 | Scocozza |

* cited by examiner

REVERSIBLE PIÑATA MOUNT ASSEMBLY

BACKGROUND OF THE INVENTION

Field of the Invention

The invention relates to a piñata mount assembly for mounting the piñata to a discrete vertical member and over the top of a wall.

Background

Piñatas are a fun activity for many parties and events. Finding a suitable place to mount the piñata can be challenging however. In some cases, people attach the piñata to the end of a pole and manually hold the piñata. This can be dangerous as children swinging the bat can hit the person holding the piñata. Some locations may have trees for mounting a piñata over a limb, but this too can be challenging when the limbs are high. Some locations don't have trees, such as the southwest but may have a pole, such as a lamp pole or porch post support, or a wall. There is no convenient and versatile means to attach a piñata to these structures however.

SUMMARY OF THE INVENTION

The invention is directed to a piñata mount assembly that has a plurality of versatile attachment orientations for attachment to either a discrete vertical member, such as a tree trunk, pole or post, or over the top of a wall. The piñata mount assembly has a reversible wall support that can be coupled to the main bracket in opposing orientations. The reversible wall support may have different mount surfaces for mounting to different types surfaces. The reversible wall support may be flipped around depending on the type of mounting member and/or the type of surface of the mounting member. A first mounting surface is a textured surface which may comprises a saw-toothed surface and a second mounting surface may be a grip surface and may comprise high friction material, such as an elastomeric material. An exemplary piñata mount assembly comprises a vertical portion coupled with the reversible wall support. An exemplary vertical portion is coupled with a horizontal portion that has threads for engagement with threads of a knob. When the knob is turned, the horizontal portion is indexed by the engaged threads and moves substantially orthogonally with respect to the vertical portion. The horizontal portion has a claw on a claw end, opposing the knob end, that can be used to couple piñata mount assembly over the top of the wall. When the piñata mount assembly is coupled to a discrete vertical member, the reversible wall mount may be reversed so that the horizontal member extends toward the pulley extension side of the main bracket. The exemplary piñata mount assembly has a mount side, the side facing the surface it is mounted to, and a pulley extension side, the side that the pulley extension extends from.

An exemplary piñata mount assembly comprises a pulley extension that is coupled with the main bracket. The main bracket may have a pulley cavity for receiving the attached end of the pulley extension, and the pulley extension may be detachably attachable to the main bracket. An exemplary pulley extension is telescoping having a plurality of telescoping portions, such as at least one or more, at least two or more, at least three or more and any range between and including the number of telescoping pulley portions listed. A pulley guide may be coupled to the extended end of the pulley extension for guiding a cord attached to the piñata. The pulley guide may comprise an aperture, such as a ring and the pulley guide may be detachably attachable to the pulley extension.

An exemplary piñata mount assembly comprise a support retainer for retaining the reversible wall mount. An exemplary support retainer comprises a slot whereby the reversible wall mount may be slid into the slot. An exemplary support retainer comprises a pair of opposing slots for retaining the opposing sides of the reversible wall mount. As described herein, the reversible wall mount may be detached from the support retainer and flipped around and reattached to the support retainer. The vertical portion and horizontal portion will also be flipped around, turned 180 degrees in this process, as they are coupled to the reversible wall mount. Flipping the reversible wall mount may expose different types of mounting surfaces, such as the textured and grip surfaces as the mount surface. Also, in a first orientation of the reversible wall mount, the horizontal member may extend toward the pulley extension side and the claw end may couple with the pulley extension to provide additional support of the pulley extension. In the second orientation of the reversible wall mount, the horizontal member may extend toward the mount side of the piñata mount assembly, and may extend the claw over the top of a wall. Turing of the knob may create a force on the claw to support the pulley extension or tighten the mount surface to the wall, depending on the orientation.

An exemplary piñata mount assembly comprises a strap that can be used to secure the piñata mount assembly to a discrete vertical member, such as a tree trunk, pole, post and the like. The strap may be detachably attachable to the main bracket. The main bracket may comprise a strap aperture for receiving the strap therethrough and a strap buckle may be used to tighten the strap, to secure it to the discrete vertical member. In an exemplary embodiment, the main bracket comprises two strap apertures configured on opposing sides of the main bracket for attaching the strap thereto. The strap may extend through the first aperture, around the discrete vertical member and then through the second strap aperture. Again, the strap buckle may be used to tighten the strap.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
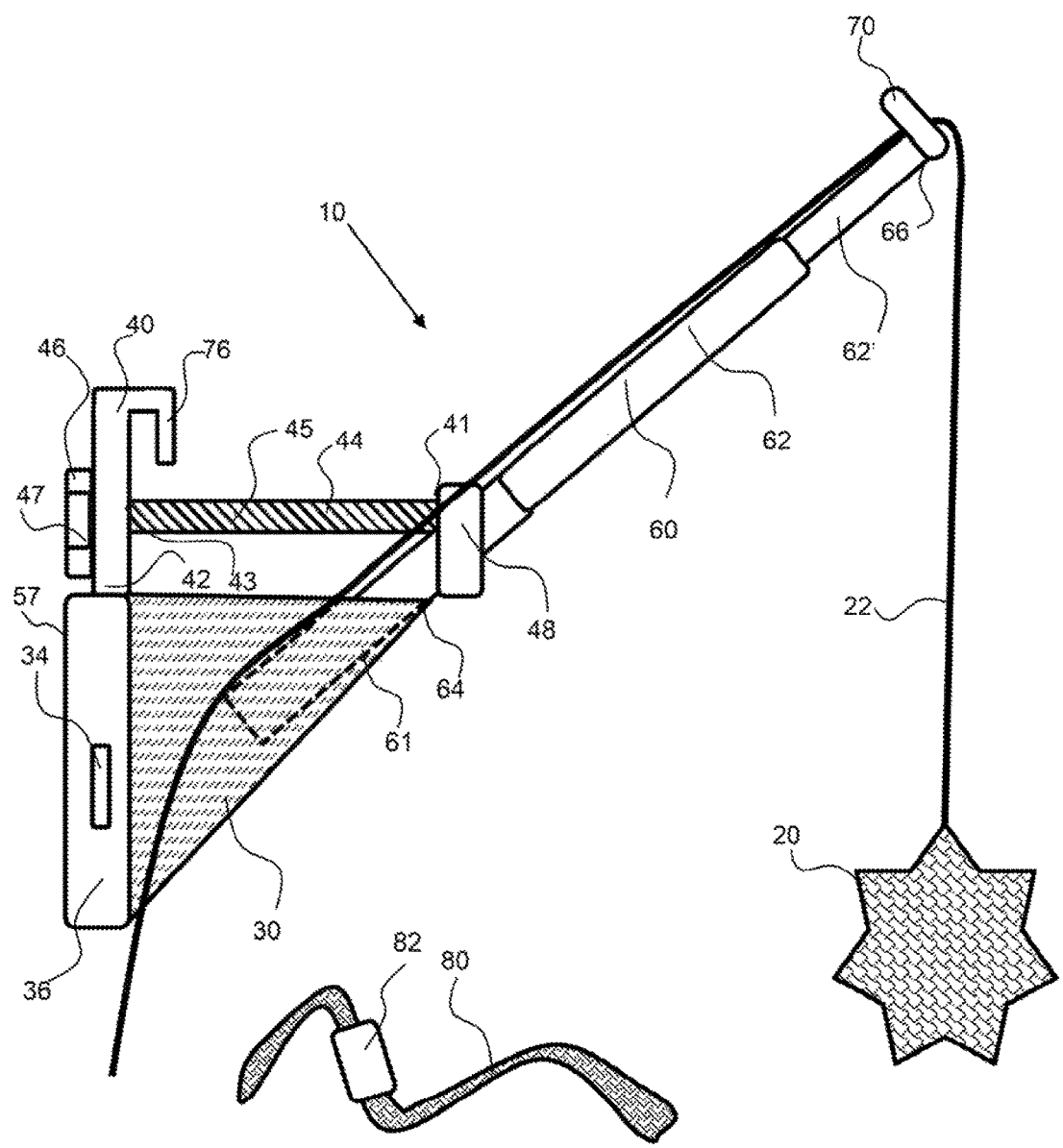
FIG. 1 shows a side view of an exemplary piñata mount assembly having a main bracket, a reversible wall support and a telescoping pulley extension.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

A discrete vertical member, as used herein, is a member that extends vertically having an outer perimeter that a strap can extend around and may be substantially circular, such as a pole or tree trunk or may be polygonal such as a light or fence post, for example. The outer perimeter of the vertical member may not exceed about four feet, or about three feet to allow a strap to extends there around.

Figure 4:
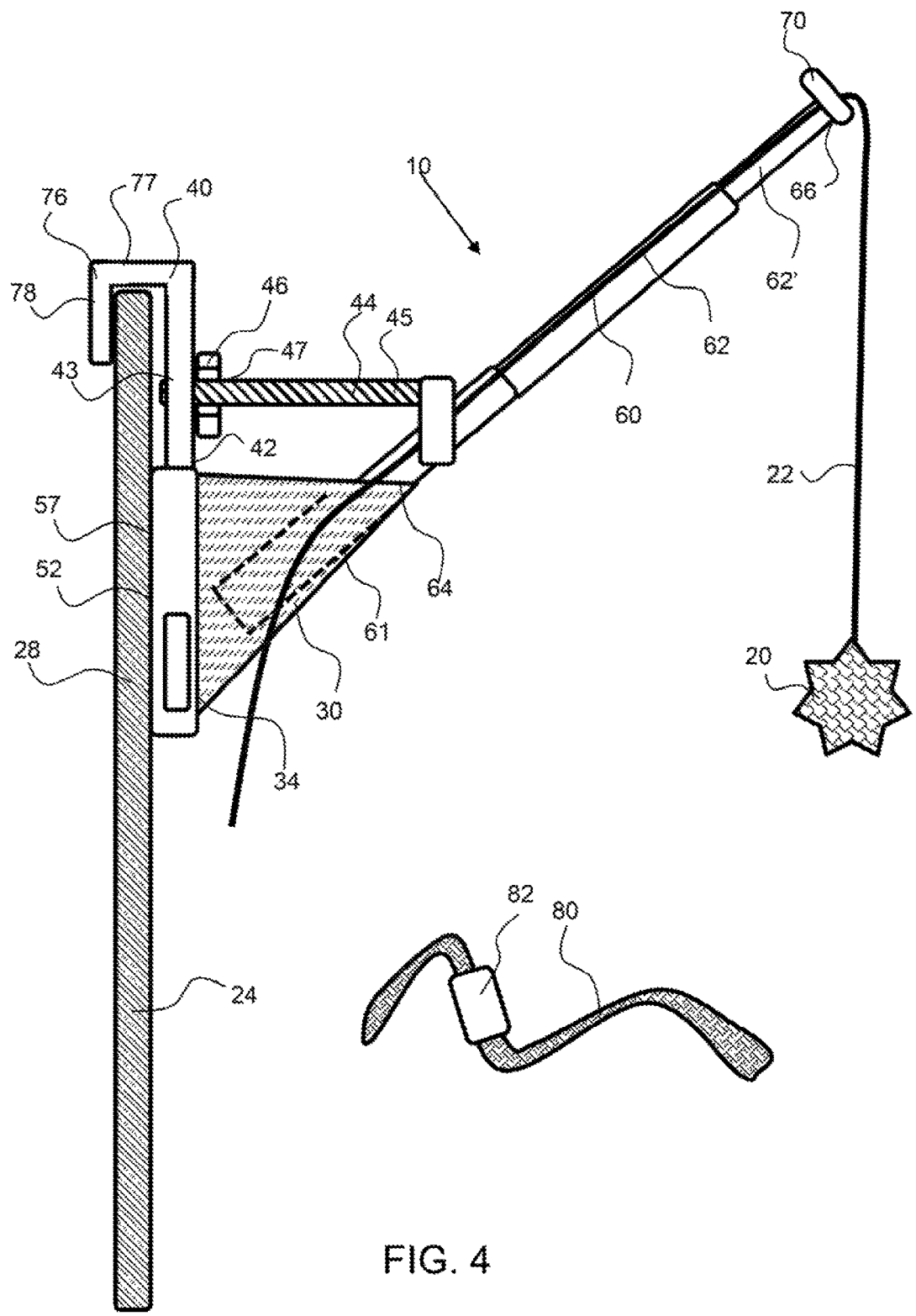
FIG. 4 shows a side view of the exemplary piñata mount assembly as shown in FIG. 1 attached to a fence.

As shown in FIG. 1, an exemplary piñata mount assembly 10 has a main bracket 30, a reversible wall support 40 that engages with the mount plate 36, and a telescoping pulley extension 60. The reversible wall support 40 slides down into the mount plate 36 and has a mount surface 57, which may be a textured surface or grip surface depending on the side that is facing toward a mount member, such as a discrete vertical member or a wall, for example. A vertical portion 42 is coupled to the reversible wall support and extends up to secure the horizontal portion 44. The horizontal portion has threads 45 that couple with knob threads 47 of the knob 46 to adjust and move the horizontal portion by turning the knob. The knob is coupled proximal to or near the knob end of the horizontal portion and on the opposing side of the vertical portion as the claw 48. Note that the vertical portion 42 may also have threads that engage with the threads of the horizontal portion. The claw 48 is coupled proximal to or near the claw end 41 of the horizontal portion. The claw may also be coupled to the pulley extension 60 to provide additional support of the pulley extension. The telescoping pulley extension 60 has a plurality of telescoping portions, 62, 62'. The telescoping pulley extension has an attached end 64, coupled with the main bracket 30, and an extended end 66. A pulley guide 70 is coupled proximal to the extended end of the telescoping pulley extension and guides a cord 22, such as a rope or string to allow movement of the piñata 20. The telescoping pulley extension may collapse down for transport and storage, as shown in FIG. 4.

Note that the strap 80 and strap buckle 82 are not attached to the mount but are part of the exemplary piñata mount assembly 10.

Figure 2:
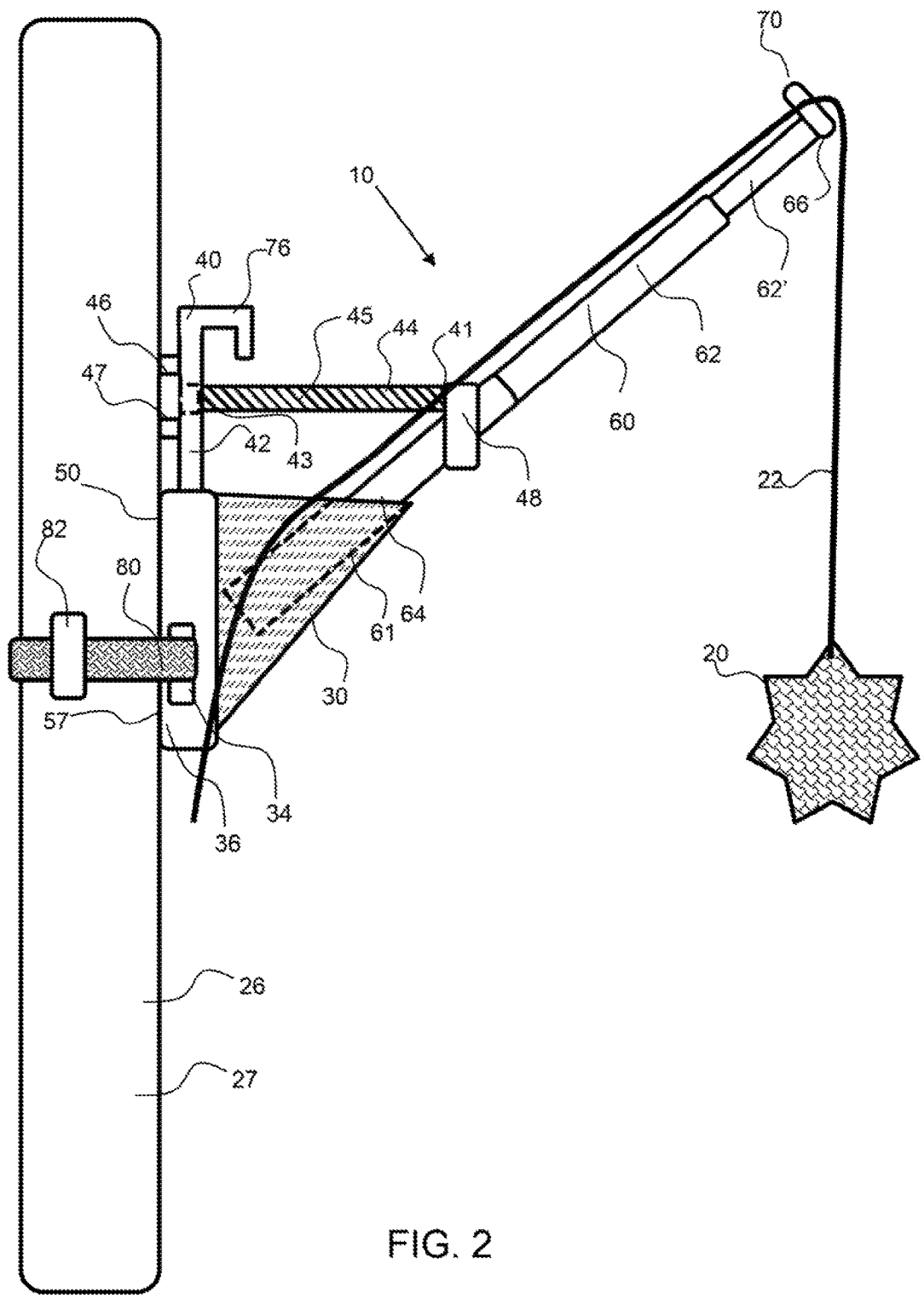
FIG. 2 shows a side view of the exemplary piñata mount assembly as shown in FIG. 1 attached to a discrete vertical member, such as a pole.

As shown in FIG. 2, an exemplary piñata mount assembly 10 is attached to a discrete vertical member 26, such as a pole 27, post or tree. A strap 80 extends around the outer perimeter of the discrete vertical member and is retained in the strap aperture 34. A buckle 82 may be used to tighten the strap around the discrete vertical member to retain the piñata mount assembly to the discrete vertical member. The reversible wall support 40 is configured with the textured surface 50 facing the discrete vertical member to provide a secure and stable engagement. The reversible wall support 40 is configured with the textured surface 50 oriented as the mount surface 57, or surface for engagement with a mounting member, such as the pole shown. Note that if the pole is a metal pole, or hard surface, the grip surface may be oriented as the mount surface to provide a more secure engagement. The reversible wall support 40 is coupled with the horizontal portion 44 that extends and couples with the pulley extension 60 and provides additional mechanical support of the pulley extension. The horizontal portion extends through an aperture 43 in the vertical portion 42, and comprises threads 45 that couple with threads 47 of the knob 46. Rotation or turning of the knob 46 moves the horizontal portion back and forth. The knob may be rotated to produce a force that pulls on the pulley extension, for example.

Figure 3:
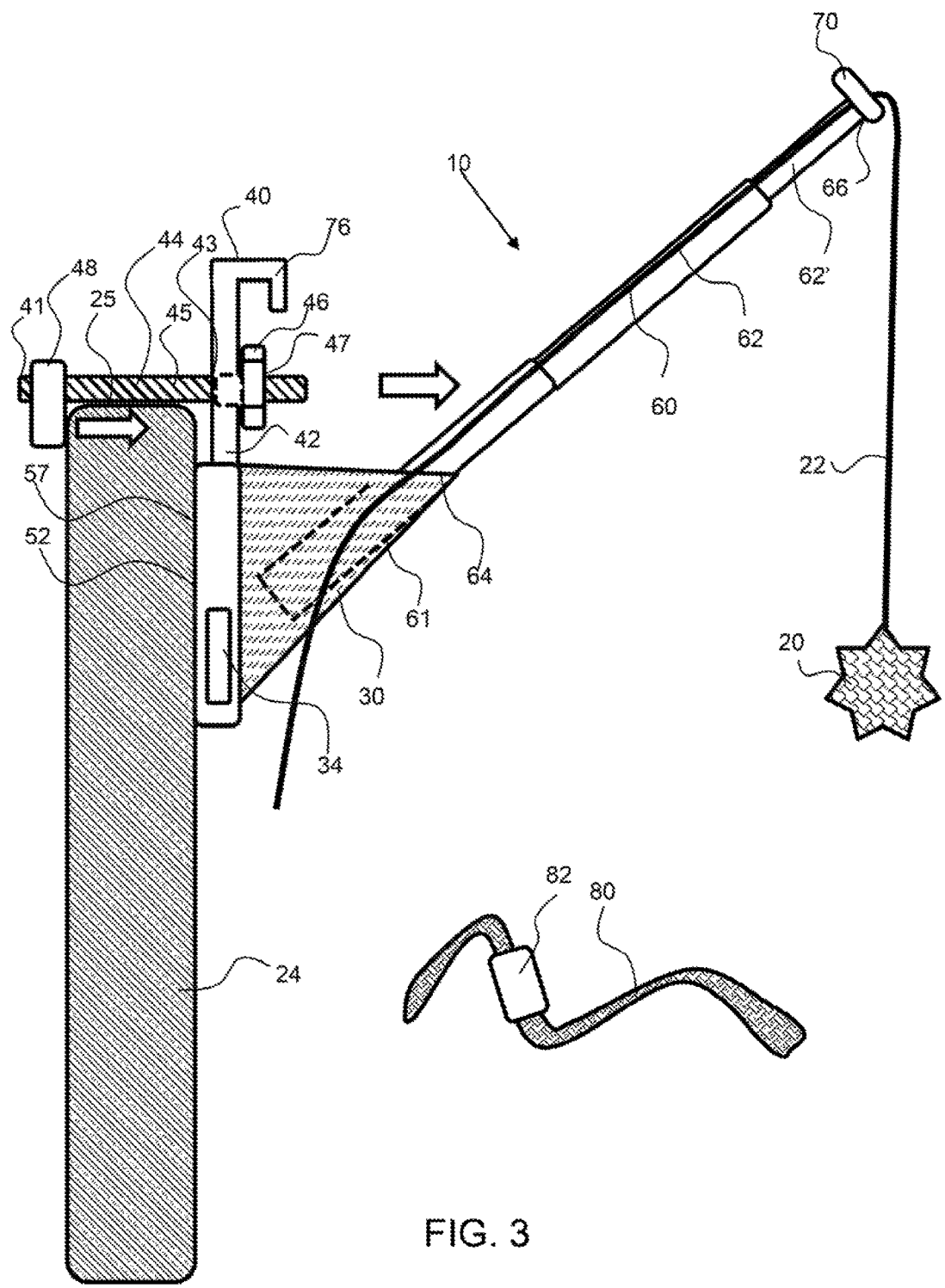
FIG. 3 shows a side view of the exemplary piñata mount assembly as shown in FIG. 1 attached to a wall.
Figure 10:
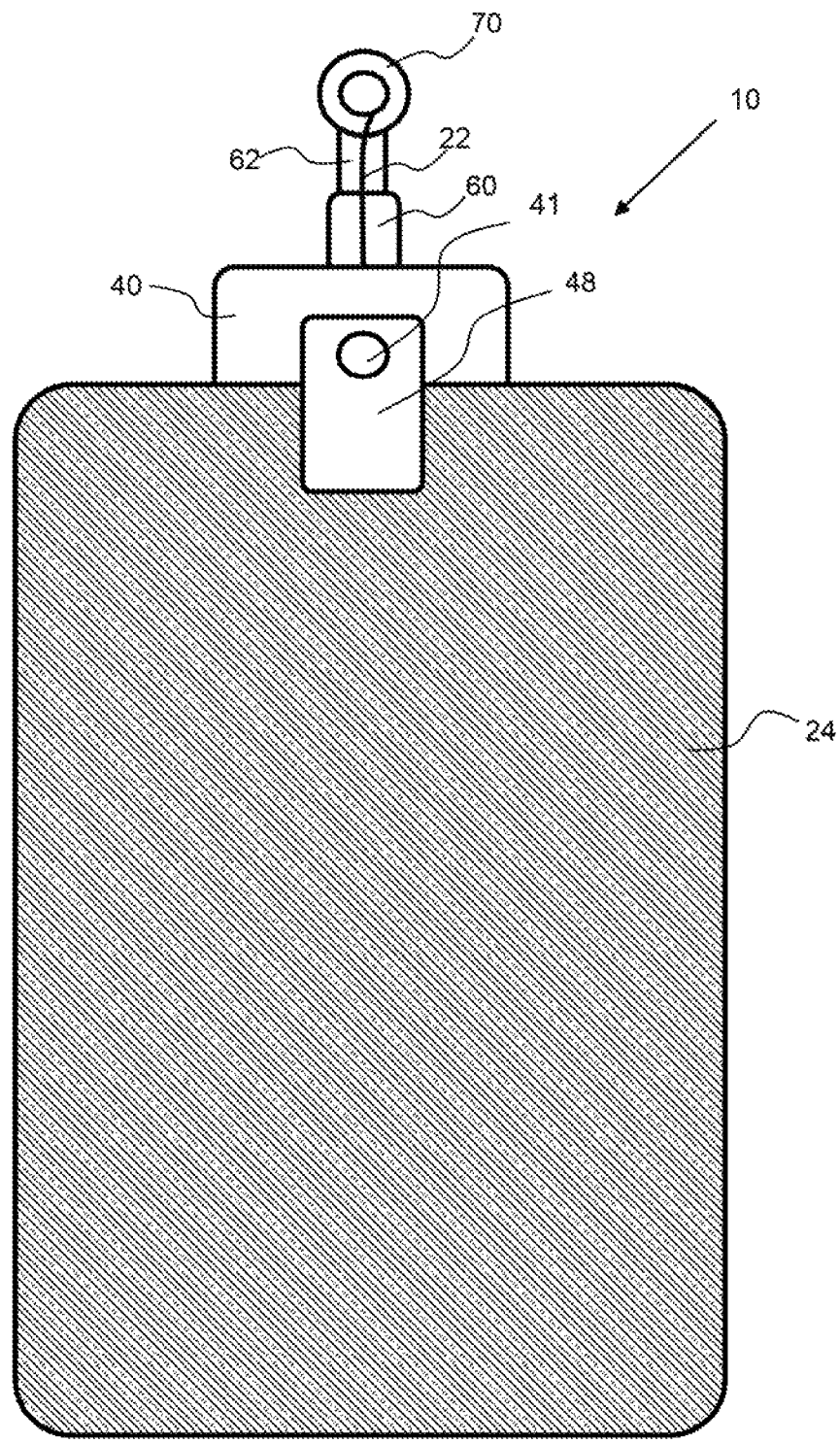
FIG. 10 shows a back view of the wall with the exemplary piñata mount assembly as shown in FIG. 3 attached to a wall.

As shown in FIG. 3, an exemplary piñata mount assembly 10 is attached to a wall 24, wherein the reversible wall support extends over the top of the wall 25. The reversible wall support 40 is coupled with the horizontal portion 44 that extends over the top of the wall and the claw 48 secures the wall support to the wall. Note that the reversible wall support is flipped around with respect to the orientation shown in FIG. 2. The grip surface 52 of the reversible wall support is facing the wall 24 to provide secure and stable engagement with the wall. The reversible wall support 40 is configured with the grip surface 52 oriented as the mount surface 57, or surface for engagement with a mounting member, such as the wall shown. Note that if the wall is soft, such as a wooden wall or member, the textured surface may be oriented as the mount surface to provide a more secure engagement. The claw 48 is positioned on the opposing side of the wall, the side opposite the main bracket 30. As described herein, the horizontal portion 44 comprises threads 45 that engage with threads of the know 46 The knob 46 may be turned to pull the horizontal portion 44 and the claw 48 toward the vertical portion 42, or main bracket side of the wall, to apply force between the claw 48 and the main bracket 30. This force, as indicated by the bold arrow, will secure the piñata mount assembly to the wall. Note that the strap 80 and strap buckle 82 are not attached to the mount but are part of the exemplary piñata mount assembly 10. A strap would not fit around a wall and therefore the claw extending over the top of the wall is the attachment mechanism as shown. As shown in FIG. 10, the claw 48 extends over the back surface of the wall to secure the exemplary piñata mount to the wall 24.

As shown in FIG. 4, an exemplary piñata mount assembly 10 is attached to a fence 28, wherein the hook portion 76 of the reversible wall support extends over the top of the fence. The hook portion is coupled with the reversible wall support 40. Note that the reversible wall support is flipped around with respect to the orientation shown in FIG. 2. The grip surface 52 of the reversible wall support is facing the fence to provide secure and stable engagement with the wall. The reversible wall support 40 is configured with the grip surface 52 oriented as the mount surface 57, or surface for engagement with a mounting member, such as the fence shown. Note that if the fence is soft, such as a wooden fence or member, the textured surface may be oriented as the mount surface to provide a more secure engagement. The hook portion may be detachably attachable to the reversible wall support to allow selection of the mount surface facing the object to be mounted to. Note that the strap 80 and strap buckle 82 are not attached to the mount but are part of the exemplary piñata mount assembly 10. A strap would not fit around a wall and therefore the claw extending over the top of the wall is the attachment mechanism as shown.

Figure 5:
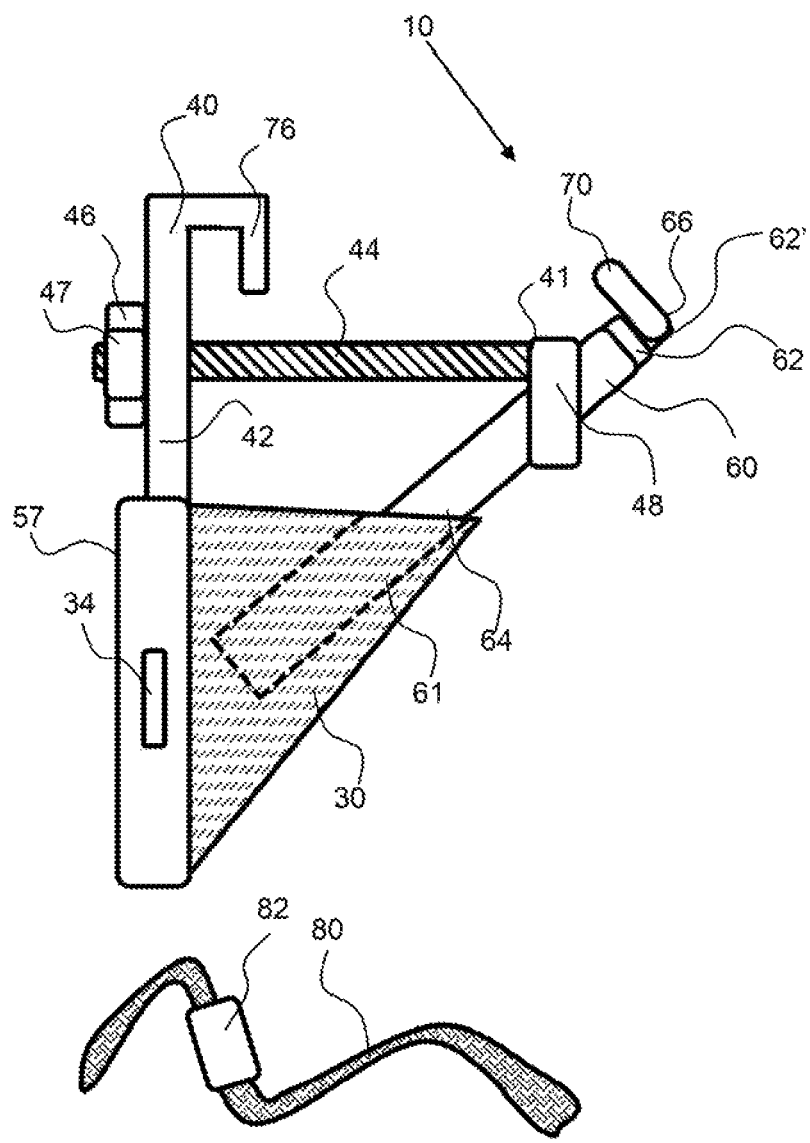
FIG. 5 shows a side view of the exemplary piñata mount assembly as shown in FIG. 1 with the pulley extension retracted down.

As shown in FIG. 5, the exemplary piñata mount assembly 10 is configured for transport with the pulley extension 60 retracted. An exemplary pully extension comprises telescoping portions 62, 62' that may be retained one inside another in a retracted orientation. Note that the strap 80 and strap buckle 82 are not attached to the mount but are part of the exemplary piñata mount assembly 10. Note that the pulley extension 60 may be detachably attachable to the main bracket 30. The pulley extension may be received and retained in the pulley cavity 61 of the main bracket, which may be a tubular shaped cavity for receiving the round cross-sectional shaped pulley extension.

Figure 6:
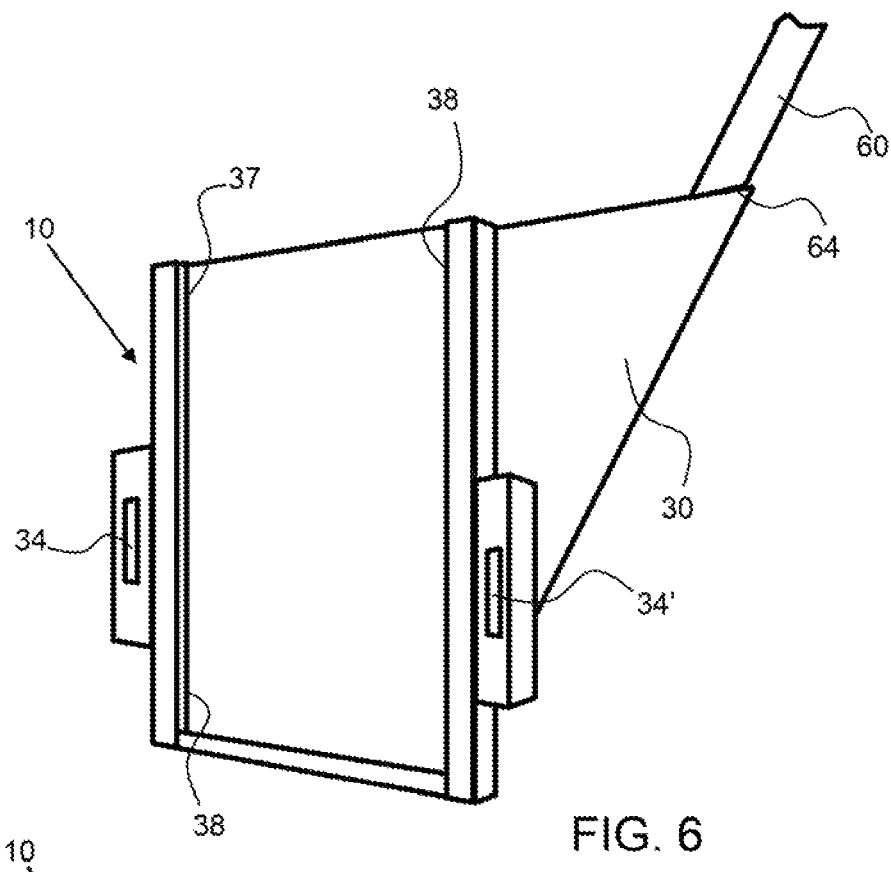
FIG. 6 shows a perspective view of the main bracket and pulley extension with the reversible wall support removed to show the support retainer.
Figure 7:
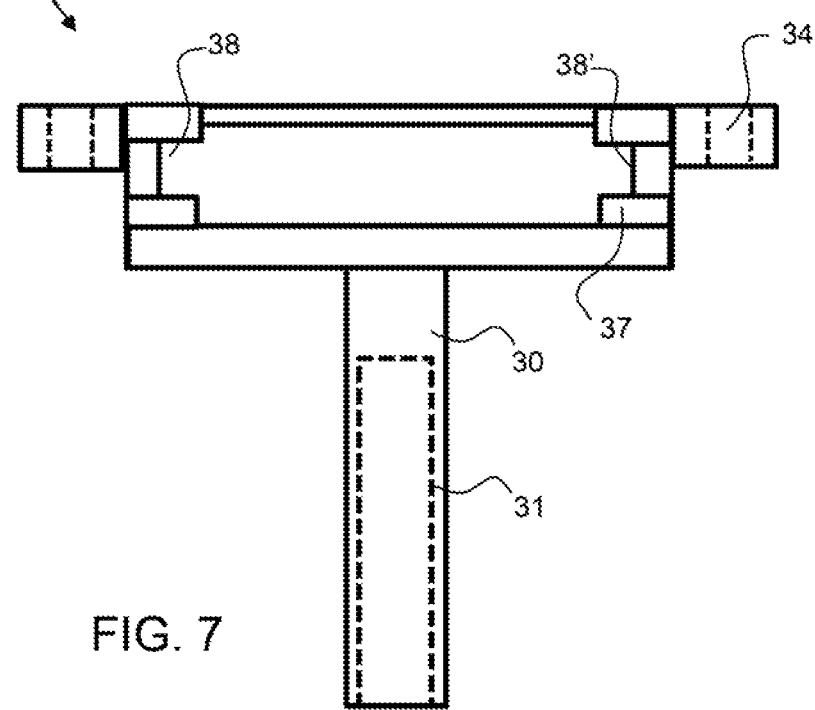
FIG. 7 shows a top view of the main bracket with the reversible wall support removed to show the support retainer.

Referring now to FIGS. 6 and 7, the main bracket 30 comprises a support retainer 37 for retaining the reversible wall support, not shown. The exemplary support retainer 37 comprises mount slots 38, 38' on either side of the back of the main bracket 30 for receiving and retaining the reversible wall support. The strap apertures 34, 34' are configured on either side of the main bracket for receiving a retaining strap, not shown. The main bracket 30 comprises a pulley receiver 31, for receiving an attached end of the pulley extension, not shown.

Figure 8:
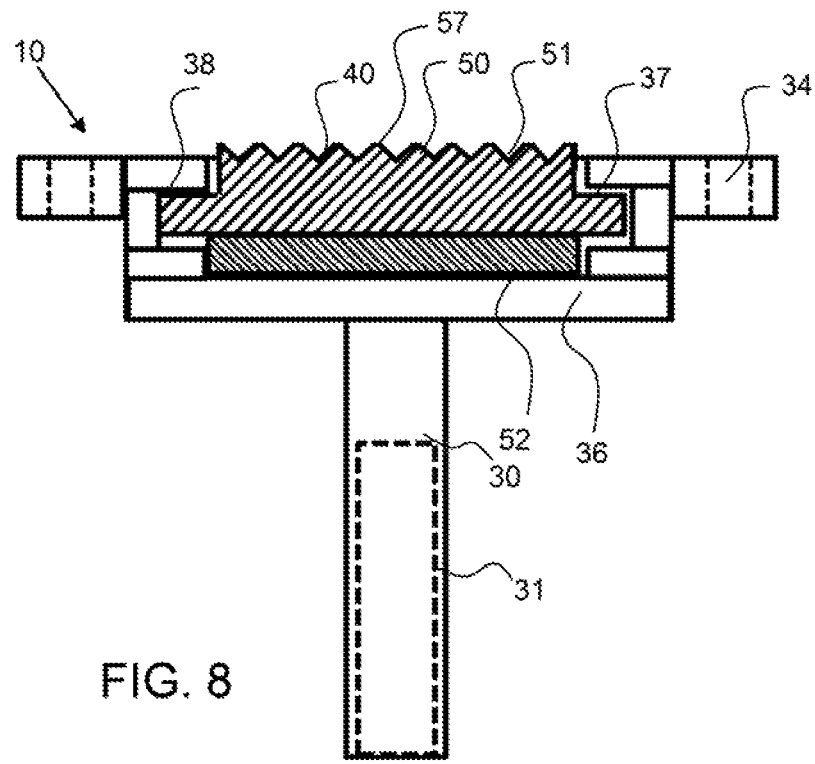
FIG. 8 shows a top view of the main bracket with the reversible wall support retained in the support retainer with the textured surface as the mount surface.
Figure 9:
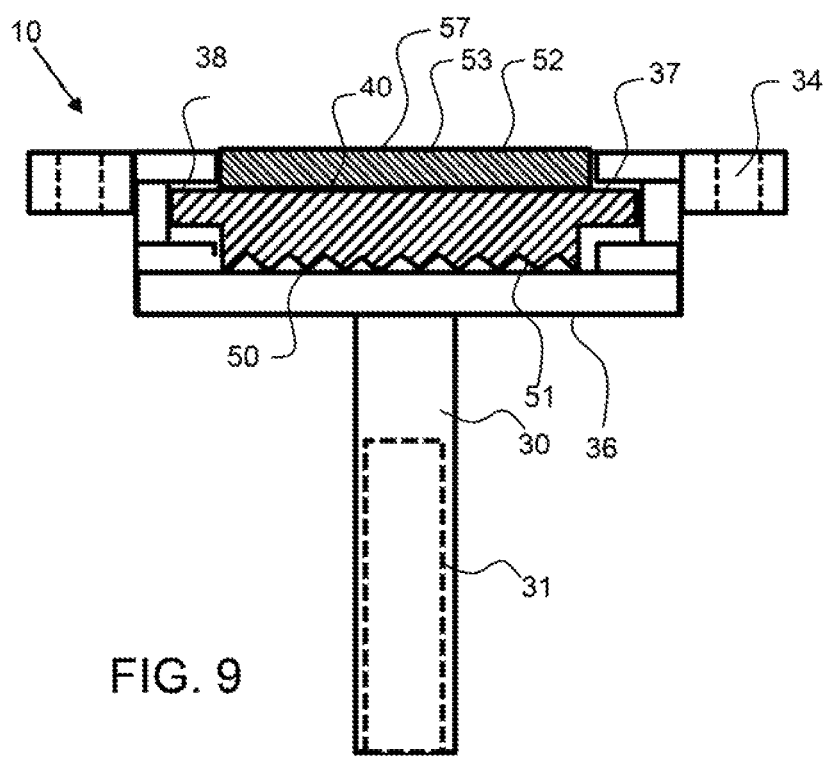
FIG. 9 shows a top view of the main bracket with the reversible wall support retained in the support retainer with the grip surface as the mount surface.

Referring now to FIGS. 8 and 9, the reversible wall support 40 is configured in the support retainer 37, wherein the reversible wall support is now slid down into the mount slots 38, 38'. As shown in FIG. 8, the reversible wall support is configured in a first direction or orientation with the textured surface 50 facing out or toward the back-side of the main bracket. As described herein the textured surface may be used for attachment to wooden post or tree, wherein the textured surface may provide a more secure engagement. The textured surface 50 may comprises a sawtooth surface 51 and this sawtooth surface may extend in a vertical direction, as shown or a horizontal direction. A horizontal direction may be preferred as it may prevent vertical slippage of the piñata mount assembly 10. The grip surface 52 is facing the main bracket or front side in FIG. 8. As shown in FIG. 9, the reversible wall support is configured in a second direction or orientation with the grip surface 52 facing out or toward the back-side of the main bracket. As described herein the grip surface may be used for attachment to smooth and/or hard surfaces, such as a wall or a metal lamp post, wherein the grip surface may provide a more secure engagement. The grip surface may comprise an elastomeric material 53, such as urethane, or silicone which has a high coefficient of friction with many surfaces. Note that there is a space in the support retainer proximal the front side of the main bracket for receiving one of the textured surface and the grip surface.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A piñata mount assembly comprising:
  a) a main bracket comprising:
    i) a support retainer;
    ii) a first strap aperture;
  b) a reversible wall support comprising:
    i) a textured surface on a first side;
    ii) a grip surface on a second side that is opposing the first side;
    wherein the reversible wall support is reversibly detachably attachable to the support retainer to expose either the textured surface or the grip surface to a back side of the main bracket;
    iii) a vertical portion coupled with the reversible wall support;
    iv) a horizontal portion coupled with the vertical portion and having threads;
    v) a knob coupled to the horizontal portion and having threads for engagement with said threads of the horizontal portion;
    wherein turning of the knob moves the horizontal portion;
    vi) a claw coupled to the horizontal portion;
  c) a pulley extension; and
  d) a strap coupled to the main bracket and extending through the strap aperture.

2. The piñata mount assembly of claim 1, wherein the main bracket comprises a pulley cavity for receiving and retaining an attached end of the pulley extension.

3. The piñata mount assembly of claim 1, wherein the pulley extension is a telescoping pulley extension comprising a plurality of telescoping portions.

4. The piñata mount assembly of claim 1, further comprising a pulley guide coupled to an extended end of the pulley extension to couple and guide a cord therethrough.

5. The piñata mount assembly of claim 1, wherein the main bracket comprises a second strap aperture, and wherein the strap apertures are configured on opposing sides of the main bracket, wherein the strap extends through each of the strap apertures and wherein the strap is detachably attachable to the main bracket.

6. The piñata mount assembly of claim 1, wherein the support retainer comprises a slot for receiving the reversible wall support.

7. The piñata mount assembly of claim 1, wherein the grip surface comprises an elastomeric material.

8. The piñata mount assembly of claim 1, wherein the textured surface comprises a sawtooth surface.

9. The piñata mount assembly of claim 1, wherein the vertical portion comprises an aperture and wherein the horizontal portion extends through said aperture.

10. The piñata mount assembly of claim 1, further comprising a hook portion extending from the reversible wall support and comprising a horizontal extension and vertical extension.

11. A method of suspending a piñata comprising the steps of:
    a) providing a piñata mount assembly as described in claim 1,
    b) providing a discrete vertical member;
    c) extending the strap around the discrete vertical member and coupling the strap to the main bracket to secure the piñata mount assembly to the discrete vertical member;
    d) coupling said piñata to the pulley extension to suspend the piñata from the piñata mount assembly.

12. The method of suspending a piñata of claim 11, further comprising orientin the textured surface of the reversible wall support as the mount surface.

13. The method of suspending a piñata of claim 11, wherein the main bracket comprises a pulley cavity for receiving and retaining an attached end of the pulley extension, and wherein the method further comprises the step inserting the pulley extension into the pulley cavity.

14. The method of suspending a piñata of claim 11, wherein the pulley extension is a telescoping pulley extension comprising a plurality of telescoping portions and wherein the method further comprises the step of extending the telescoping pulley.

15. The method of suspending a piñata of claim 11, wherein the piñata mount assembly comprises a pulley guide coupled to an extended end of the pulley extension to couple and guide a cord therethrough and wherein the method further comprises the step of configuring a cord through the pulley guide and attaching said piñata to the cord.

16. The method of suspending a piñata of claim 11, wherein the support retainer comprises a slot for receiving the reversible wall support, and wherein the method further comprises the step of inserting the reversible wall support into said slot.

* * * * *